Figure 1:
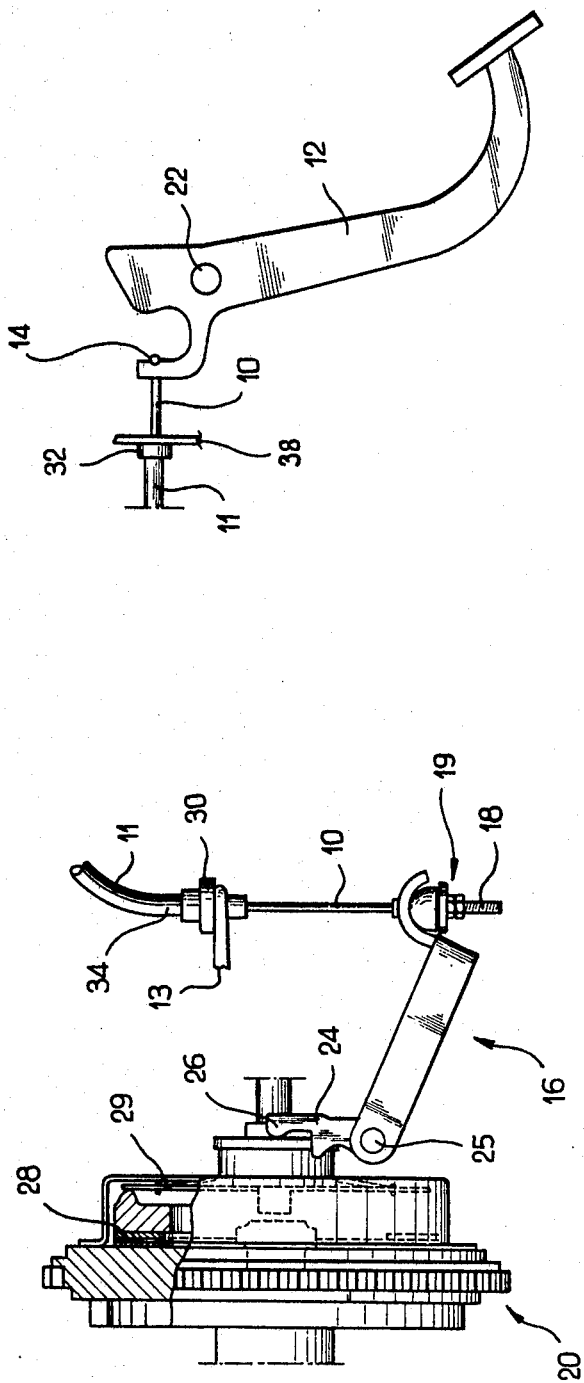

United States Patent [19]

Deligny

[11] 4,420,988
[45] Dec. 20, 1983

[54] MECHANICAL CONTROL ARRANGEMENT BY A CABLE WHICH IS SLIDEABLE AXIALLY IN A FLEXIBLE SHEATH

[75] Inventor: Jean Deligny, Epinay sur Seine, France

[73] Assignee: Societe Anonyme D.B.A., Paris, France

[21] Appl. No.: 211,008

[22] Filed: Nov. 28, 1980

[30] Foreign Application Priority Data

Dec. 7, 1979 [FR] France ............................... 79 30097

[51] Int. Cl.³ .............................................. F16C 1/22
[52] U.S. Cl. ............................ 74/501.5 R; 192/111 A
[58] Field of Search .............. 74/501.5 R; 192/111 A; 188/196 R, 196 M, 196 P

[56] References Cited

U.S. PATENT DOCUMENTS 2,957,354 10/1960 Morrow ............................. 74/501.5

FOREIGN PATENT DOCUMENTS 2910421 9/1979 Fed. Rep. of Germany ... 192/111 A
2111125 6/1972 France .
2278982 3/1976 France .
2375489 7/1978 France .

Primary Examiner—Kenneth Dorner
Attorney, Agent, or Firm—Ken C. Decker; Paul David Schoenle

[57] ABSTRACT

A control arrangement is of the type comprising a control transmission chain which includes a cable (10), an actuating member such as a pedal (12) connected to one end (14) of the cable, and possibly a system of levers interposed between the other end (18) of the cable and a receiving member (28) such as a friction clutch, the flexible sheath being anchored in the vicinity of one of its ends (34) to a fixed part of a support structure (13). The end portion (36, 48) of said sheath in the vicinity of its other end (37) is mounted with the possibility of axial movement in a fixed support (38) which is fixed with respect to said support structure. A device (40) for momentary blocking of said axial movement is interposed between said end portion (36, 48) of the sheath and said fixed support (38), the blocking device (40) comprising a control member (74, 42) coupled to a point on said control transmission chain.

10 Claims, 5 Drawing Figures

FIG_1 (PRIOR ART)

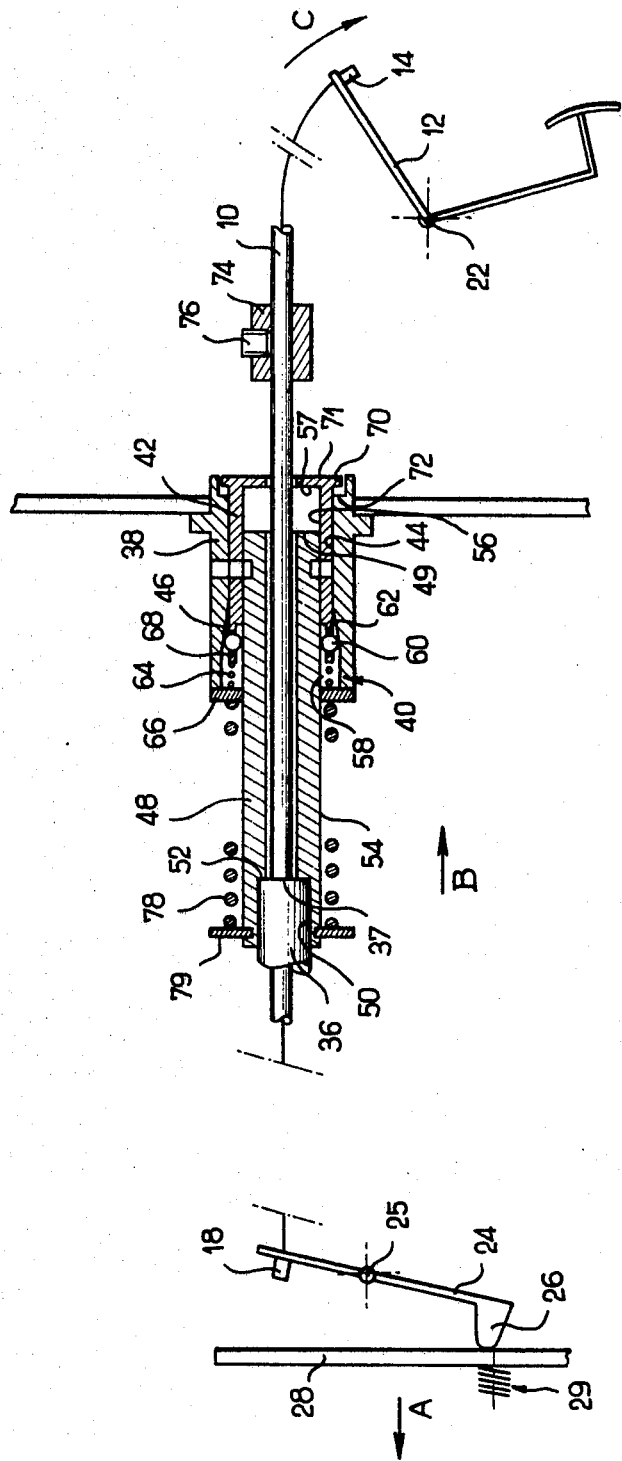

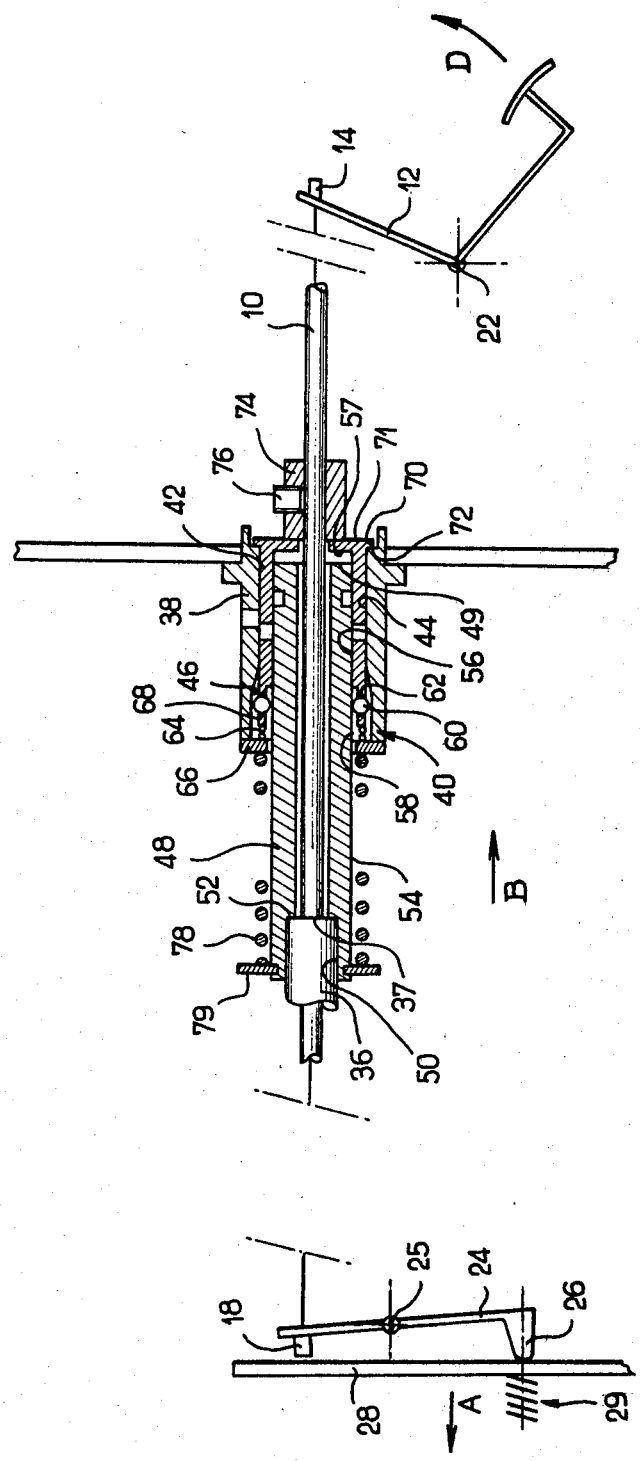
FIG_4

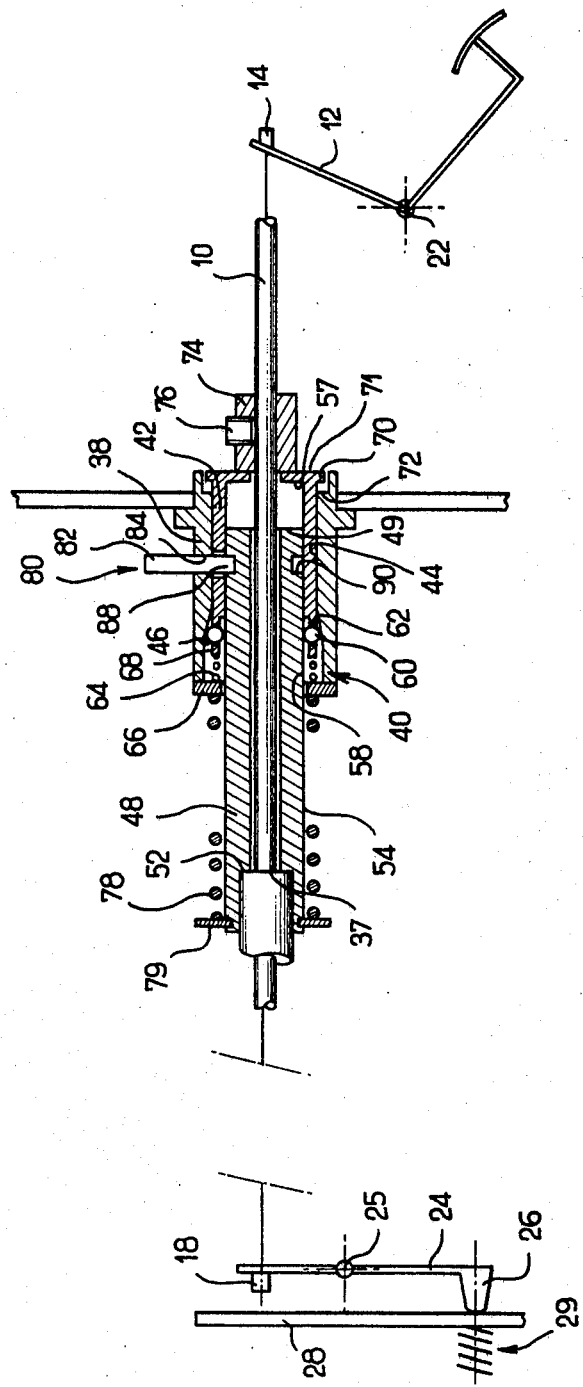
FIG._5

MECHANICAL CONTROL ARRANGEMENT BY A CABLE WHICH IS SLIDEABLE AXIALLY IN A FLEXIBLE SHEATH

The present invention concerns a mechanical control arrangement using a cable which is axially slideable in a flexible sheath.

The invention concerns mechanical control arrangements of the type comprising a control transmission chain including a cable, an actuating member such as a pedal connected to one end of the cable, and possibly a lever system interposed between the other end of the cable and a receiving member such as a friction clutch for a motor vehicle.

Mechanical control arrangements of this kind are known, wherein the two ends of the outer flexible sheath bear against two sheath end stops which are fixed on a support structure. When a control arrangement of this type is used for actuating a motor vehicle clutch, for example of the single-disc dry type clutch, wear of the friction linings which results from the clutch being successively engaged and disengaged causes increasing clearances to occur between the various components of the clutch. If the mechanism does not have any means for compensating for such clearances, the rest position of the clutch operating pedal gradually varies until it arrives at a final position, corresponding to the maximum degree of wear of the friction linings, wherein the pedal is several centimeters higher than its initial rest position (new friction linings). It is also found, after such a control mechanism is installed in a vehicle and after the mechanism has been used for a short time, that the cable tends to lengthen under the effect of the pulling forces applied thereto, while the sheath tends to shorten under the effect of the compression forces which are applied thereto as a reaction to the pulling forces on the cable. The increase in length of the cable and the reduction in length of the sheath are added together and also cause parasitic clearances to occur in the control transmission chain, which are harmful to proper operation of the mechanism.

The invention is directed to a mechanical control arrangement using a cable which is slideable axially in a flexible sheath, which permits all the clearances which may occur in use of such a control mechanism to be automatically taken up.

For this purpose, the present invention proposes a mechanical control arrangement using a cable slideable axially in a flexible sheath, of the type comprising a control transmission chain which includes said cable, an actuating member such as a pedal connected to one end of said cable, and possibly a lever system interposed between the other end of said cable and a receiving member such as a friction clutch, said sheath being anchored in the vicinity of one of its ends to a fixed part of a support structure such as the chassis of a vehicle, characterised in that the end portion of said sheath in the vicinity of its other end is mounted with the possibility of axial movement in a fixed support which is fixed with respect to said support structure, and that a device for momentarily blocking said axial movement is interposed between said end portion of the sheath and said fixed support, said momentary blocking device comprising a control member which is coupled to a point on said control transmission chain.

Figure 2:
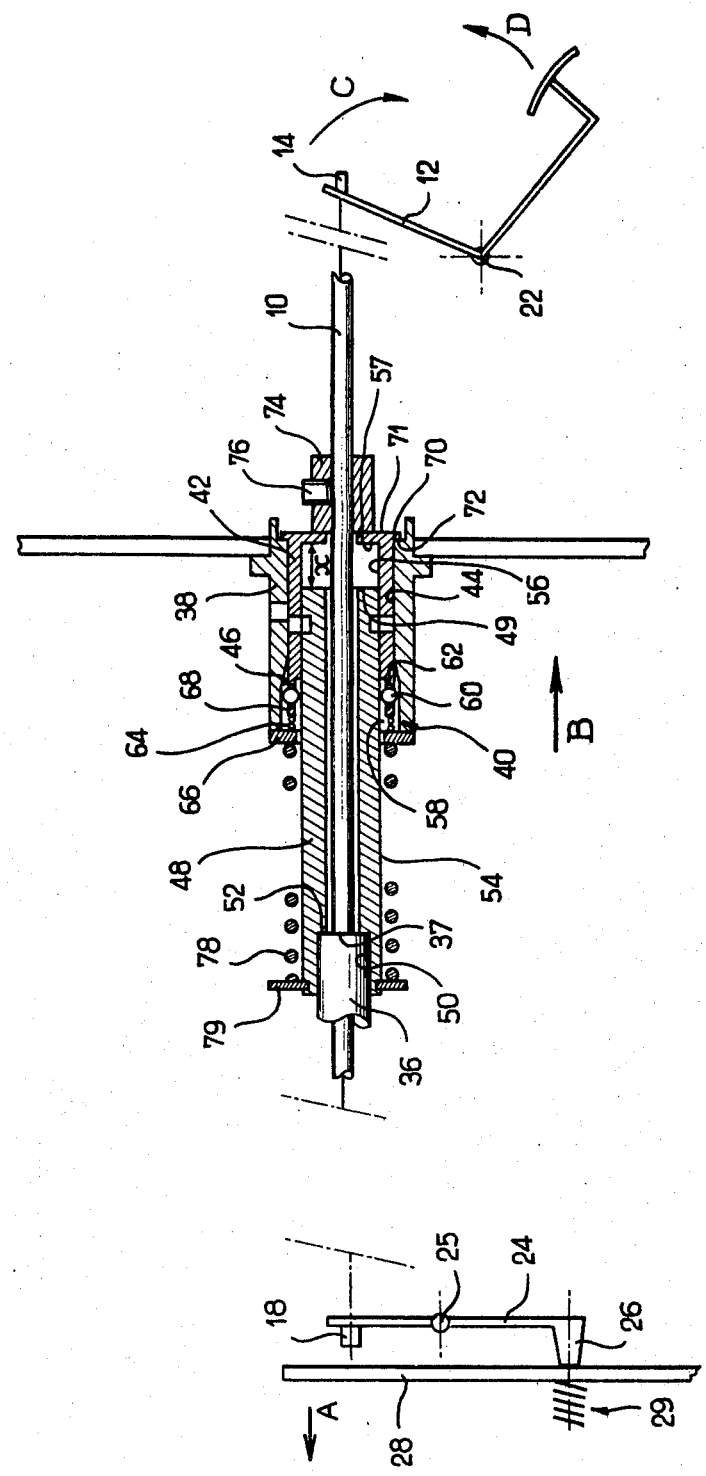

The invention will now be described with reference to the accompanying drawings in which:

FIG. 1 shows a mechanical control arrangement using a flexible cable, which is known in the art, FIG. 2 shows a mechanical control arrangement according to the invention, FIG. 3 shows the mechanical control arrangement shown in FIG. 2, in its actuated position, FIG. 4 shows the mechanical control arrangement illustrated in FIG. 2, in its rest position, after clearances have been automatically taken up, and FIG. 5 shows the control arrangement shown in FIG. 2, upon installation and adjustment thereof.

FIG. 1 shows a mechanical control arrangement using a cable which is slideable axially in a flexible sheath of the "BOWDEN" type comprising a control transmission chain which includes a flexible cable 10, an actuating member which in this case comprises a pedal 12 connected to one end 14 of the cable 10, and a system of levers 16 which is interposed between the second end 18 of the cable 10 and a receiving member 20 which, in the embodiment illustrated, comprises a friction clutch of the single-disc type for a motor vehicle. The actuating pedal 12 is mounted pivotally on a support structure 13 by means of a spindle 22. The second end 18 of the cable 10 is connected to a lever system 16 which comprises a fork member 24 for controlling the friction clutch 20. The fork member 24 is mounted pivotally on the support structure by means of a spindle 25. The end 26 of the fork member 24 is capable, when an operator actuates the pedal 12, of acting on a clutch disc 28 so as to displace the clutch disc against the force applied by return springs 29, to cause disengagement of the clutch 20. In this actuating mechanism, the two ends of the sheath 11 bear against sheath end stops 30 fixed to support structure 13 and 32 fixed to the support member 38.

FIG. 2 is a diagrammatic view of a sliding cable-type mechanical control arrangement according to the invention. As in the mechanism shown in FIG. 1, the end 34 of the sheath 11 is anchored to the support structure in per se known manner by means of the sheath end stop 30. According to the invention, the end portion 36 of the sheath in the vicinity of its other end 37 is mounted with the possibility of axial movement in a fixed support 38 which is fixed with respect to the support structure in a manner which will now be described. A releasable blocking means or device generally denoted by reference numeral 40 is a device for momentary blocking of the end portion 36 of the sheath with respect to the fixed support 38. The device 40 comprises a disconnectible connecting system including axially slidable locking means which involves a wedging action by means of balls. This system comprises a sleeve 42 which is mounted slideably in a bore 44 in the fixed support 38. A frustoconical contact surface 46 is formed in the bore 44 of the fixed support 38. The end portion 36 of the sheath 11 is provided with a rigid tubular extension 48 which is fixed to the end portion of the sheath 36. As can be seen from FIG. 2, the end portion 36 is engaged into a bore 50 formed in the tubular extension 58, with the end 37 of the sheath 11 bearing against the end 52 of the bore 50. The outside surface 54 of the tubular extension 48 defines a cylindrical contact surface capable of sliding in an internal bore 56 formed in the sleeve 42. The frustoconical bearing surface 46 and the cylindrical bearing surface 54 define therebetween a recess or housing 58 in which there are received balls 60. The balls 60 are distributed in a circular configuration and are disposed in radial bores 62 formed in the sleeve 42. The balls 60 are mounted rotatably in the bores 62. A cylindrical spring 64 which bears against an abutment surface formed by a radial internal shoulder 66 formed at the left-hand end of the fixed support 38 urges the end 68 of the sleeve 42 in the direction indicated by arrow B.

The control mechanism is shown in its rest position in FIG. 2. The sleeve 42 is provided with a radial shoulder 70 which, in the rest position, is held in abutment against a shoulder 72 formed on the fixed support 38, under the action of the control member or means 74 associated with the cable 10. The control member is formed by an abutment 74 which is fixed to the cable 10 in a controllable manner by means of a pressure screw 76. As can be seen from FIG. 2, the abutment 74 holds the shoulder 70 of the sleeve 42 in a position of abutment against the shoulder 72 of the fixed support 38 so as to move the balls 60 away from the frustoconical bearing surface 46, acting against the force applied to the sleeve 42 by the spring 64. It will be appreciated that in this position, the wedging ball-type disengageable connecting system 40 is disengaged, thus permitting axial movement of the tubular extension 48 of the sheath 11 with respect to the fixed support 38.

FIG. 3 shows the control mechanism of FIG. 2 in its actuated position. When the operator applies a force to the pedal 12, he causes the pedal 12 to pivot about its spindle 22. This pivotal motion causes displacement of the end 14 of the cable in the direction indicated by arrow C. This displacement of the cable causes displacement of the abutment 74 away from the sleeve 42. Under the effect of the cylindrical spring 64, the sleeve 42 is displaced in the direction indicated by arrow B until the balls 60 come to bear against the frustoconical surface 46. It will be appreciated that, in this position, any displacement of the tubular extension 48 in the direction indicated by arrow B is prevented by the balls 60 being wedged between the bearing surfaces 46 and 54. The pulling force applied to the cable 10 is therefore directly transmitted to the clutch fork member 24 which causes the clutch disc 28 to be displaced in the direction indicated by arrow A against the force of the return springs 29. When the operator relaxes the force applied to the pedal 12, all the components of the control mechanism return to their rest position as shown in FIG. 2.

FIG. 4 shows the mechanical control arrangement in its rest position and after a large number of clutch engagement and disengagement operations have caused substantial wear of the friction linings of the clutch disc 28. As can be seen from FIG. 4, the reduction in the thickness of the friction linings of the clutch 28 has caused a change in the rest position of the disc 28 and thus in the rest position of the clutch fork member 24. The end 26 of the fork member 24 has moved in the direction indicated by arrow B thereby causing equivalent displacement of the end 18 of the cable 10 in the direction indicated by arrow A. Without a device permitting axial movement of the extension 48 with respect to the fixed support 38, such as the wedging action-type locking system 40, the additional displacement of the end of the cable 18 would have repercussions on the end of the cable 10 and would thereby cause a change in the rest position of the pedal 12, which would go upwardly in the direction indicated by arrow D. By virtue of the system 40, and as soon as the abutment 74 comes into contact with the sleeve 42 and moves the shoulder 70 of the latter into a position of abutment against the shoulder 72 of the fixed support 38, disengagement of the system permits the tubular portion 48 which extends the end 36 of the sheath 11 to be freely positioned with respect to the fixed support 38, moving in the direction indicated by arrow B over a distance equal to the additional displacement of the end 18 of the cable 10. This displacement is permitted only by virtue of the flexibility of the sheath 11 and by virtue of the length of the latter, which is greater than the distance between the fixed abutment 30 and the fixed support 38. It wll be appreciated that in this way any clearances which may appear in the cable-type control mechanism are automatically taken up and thus the actuating pedal 12 occupies a rest position which remains the same, irrespective of wear of the friction linings of the clutch disc 28, up to the maximum permissible wear limit of the friction linings.

In accordance with the invention, the disengageable connecting system 40 which involves a ball wedging action and which permits momentary blocking of the axial movement of the end portion 36 of the sheath 11 with respect to the fixed support 38 also makes it possible to provide for automatic compensation of the clearances which may occur in the mechanical control arrangement when the cable 10 is elongated or when the sheath 11 is reduced in length, under the effect of the compression forces applied thereto. Indeed, in most cases, the sheath 11 comprises a helically wound metal wire, the turns of which may compress under the force.

In the event of stretching of the cable 10 or a reduction in the length of the sheath 11, the tubular extension 48 of the sheath 11 is freely positioned with respect to the fixed support 38, by moving axially in the direction indicated by arrow A. This movement occurs under the action of a coaxial cylindrical spring 78 which bears against the shoulder 66 of the fixed support 38 and which engages the tubular extension 48 of the sheath 36 by means of a circlip 79 which is secured thereto.

FIG. 5 shows the mechanical control arrangement shown in FIG. 2, upon installation and adjustment thereof. In order to permit initial adjustment of the mechanism, removable means 80 are provided on the mechanism. Such means comprise a pin 82 which is inserted into a radial bore 84 formed in the fixed support 38. The pin 82 is also inserted into a radial bore 86 in the sliding sleeve 42. The end 88 of the pin 82 opens from the bore 86 into a cylindrical groove 90 formed in the tubular extension 48 on the end portion 36 of the sheath 11.

In the position shown in FIG. 5, the tubular extension 48 and the sleeve 42 are axially immobilised with respect to the fixed support 38 by means of the pin 82. As will be readily seen, the diameter of the bore 86 is greater than the diameter of the pin 82 in order to permit the balls 60 certainly to come to bear against the bearing surface 46 under the force applied to the sleeve 42 by the spring 64.

Initial adjustment of the mechanism is effected in the following manner: after the mechanism has been installed on the support structure and after the ends 14 and 18 of the cable 10 have been connected to the pedal 12 and the levers 16, the initial tension of the cable is adjusted for example by means of a nut-and-screw such as the system 19 shown in FIG. 1, which is known per se and which is disposed at one of the ends of the cable 10. The adjustable abutment is then brought into a position of contact with the end wall 71 of the sleeve 42, taking care to ensure that no force is applied to the sleeve 42, against the force applied by the spring 64. In this position, the abutment 74 is fixed to the cable 10 by means of the screw 76. It then only remains to remove the pin 80, in which case the extension 48 occupies an initial rest position in which its end 49 is spaced by a distance "x" (see FIG. 2) from the end 57 of the bore 56 in the sleeve 42. The distance "x" is slightly greater than the maximum degree of wear of the friction linings of the clutch 20.

It should be noted that, by virtue of the device 40, pre-adjustment in respect of the initial stress of the spring by means of a system of the type 19 is not absolutely essential, in which case initial adjustment occurs automatically by virtue of the spring 78, as described above.

I claim:

1. A mechanical actuating mechanism including a cable axially slidable in a flexible sheath, said cable having one end connected to a receiving member to be actuated and its other end connected to an actuating member, said flexible sheath having one end adjacent said one end of said cable anchored to a fixed support structure and its other end adjacent said other end of said cable axially slidably received in a stationary tubular support member, from which extend said one end of said cable, spring biased releasable blocking means interposed between said other end of said sheath and said stationary support member for momentarily blocking axial movement of said other end of said sheath with respect to said stationary support member upon actuation of said cable, and control means coupled adjacent to said other end of said cable for releasing said blocking means against the biasing force of said spring when said cable is not actuated.

2. A mechanism according to claim 1, wherein said stationary support member is formed internally locally with cam means and wherein said releasable blocking means comprises axially slidable locking means normally urged by said spring to cooperate with said cam means for wedgingly blocking axial movement of said other end of said sheath with respect to said stationary support member.

3. A mechanism according to claim 2, wherein said axially slidable locking means includes at least one wedging ball.

4. A mechanism according to claim 3 wherein said ball is housed in a sleeve slidably interposed between said other end of said sheath and said stationary support member, said spring being arranged between one end of said sleeve and said support member for biasing said sleeve in the direction towards said other end of said cable.

5. A mechanism according to claim 4, wherein said control means is adjustably secured to said other end of said cable so as to selectively cooperate in abutment with the other end of said sleeve opposite to said one end thereof.

6. A mechanism according to claim 4, further comprising a resilient means disposed between said stationary support member and said other end of said sheath so as to bias permanently said sheath in compression towards said fixed support structure.

7. A mechanism according to claim 6, wherein said other end of said sheath comprises a rigid tubular extension.

8. A mechanism according to claim 7, further comprising removable adjusting means for initial adjustment of the mechanism when said cable is not actuated.

9. A mechanism according to claim 8, wherein said removable adjusting means comprises a removable member for axially immobilizing said other end of said sheath and said sleeve with respect to said stationary support member.

10. A mechanism according to claim 5, further comprising a resilient means disposed between said stationary support member and said other end of said sheath so as to bias permanently said sheath in compression toward said fixed support structure.

* * * * *